United States Patent
Li (10) Patent No.: US 7,656,910 B2
(45) Date of Patent: Feb. 2, 2010

(54) ADD DROP MULTIPLEXING METHOD, APPARATUS AND SYSTEM BASED ON GFP

(75) Inventor: Congqi Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 11/805,775

(22) Filed: May 24, 2007

(65) Prior Publication Data

US 2007/0230495 A1 Oct. 4, 2007

Related U.S. Application Data

(63) Continuation of application No. PCT/CN2005/002002, filed on Nov. 25, 2005.

(30) Foreign Application Priority Data

Nov. 25, 2004 (CN) .................... 2004 1 0096026

(51) Int. Cl.
*H04J 3/04* (2006.01)
(52) U.S. Cl. ............... 370/535; 370/229; 370/235; 370/419; 370/454; 370/536; 370/537
(58) Field of Classification Search ............ 370/229, 370/230, 235, 412–415, 419, 429, 444, 454, 370/455, 456, 459, 473, 535, 536, 537
See application file for complete search history.

(56) References Cited

U.S. PATENT DOCUMENTS

| | | | |
|---|---|---|---|
| 7,209,493 B2 * | 4/2007 | Shinoda | 370/510 |
| 2002/0090007 A1 | 7/2002 | Kamiya et al. | |
| 2002/0176450 A1 * | 11/2002 | Kong et al. | 370/539 |
| 2003/0058888 A1 | 3/2003 | Shinoda | |
| 2004/0105459 A1 * | 6/2004 | Mannam | 370/465 |
| 2004/0205230 A1 | 10/2004 | Fontana et al. | |
| 2006/0222005 A1 * | 10/2006 | Gorshe et al. | 370/466 |
| 2007/0098006 A1 * | 5/2007 | Parry et al. | 370/437 |
| 2007/0116045 A1 * | 5/2007 | Mohan et al. | 370/466 |
| 2009/0090007 A1 * | 4/2009 | Takada et al. | 29/893.1 |
| 2009/0185578 A1 * | 7/2009 | Zeng | 370/466 |

OTHER PUBLICATIONS

International Search Report from International Application No. PCT/CN2005/02002.

* cited by examiner

*Primary Examiner*—Kwang B Yao
*Assistant Examiner*—Nguyen Ngo
(74) *Attorney, Agent, or Firm*—Conley Rose, P.C.; Grant Rodolph (57) ABSTRACT

The present invention relates to network transmission technologies, and provide a Generic Framing Procedure (GFP)-based add/drop multiplexing (add/drop multiplexing) method, apparatus and system to improve add/drop multiplexing utilization, in which multiple Gigabyte Ethernet (GE) connections among multiple nodes are multiplexed in GFP to a byte synchronous interface for transmission, wherein a bandwidth of the byte synchronous interface is smaller than a sum of peak bandwidths of the group of GE connections borne on the byte synchronous interface; statistical multiplexing is carried out on effective data borne on the multiple GEs by means of buffers, and the effective data are treated by priority in the case of network congestion. The present invention implements statistical add/drop multiplexing for multiple data services in various types, and can be used in implementing a statistical ADM for diverse data services in burst mode, even a statistical ADM for multiple mixed services.

10 Claims, 4 Drawing Sheets

ADD DROP MULTIPLEXING METHOD, APPARATUS AND SYSTEM BASED ON GFP

CROSS-REFERENCE TO RELATED APPLICATIONS

The present application is a continuation of PCT Application No. PCT/CN2005/002002, filed on Nov. 25, 2005, which claims a priority to Chinese Patent Application No. 200410096026.7, filed on Nov. 25, 2004. All of these applications are incorporated herein by reference for all purposes.

FIELD OF THE INVENTION

The present invention relates to network multiplexing technologies, and particularly to a broadband network channel multiplexing technology, specifically to an Add/drop multiplexing method, apparatus and system based on Generic Framing Procedure (GFP).

BACKGROUND OF THE INVENTION

As the Internet grows continuously, the data volume transported through the Internet become increasingly huge. Since conventional narrow band networks can not meet people's demands any more, many typical broadband technologies have emerged. Generic Framing Procedure (GFP), defined in ITU-T G.7041/Y.1303, is a new data link framing protocol mainly for block codes based on byte synchronous transmission channels or packet-oriented data streams.

Unlike High Level Data Link Control (HDLC) protocol that determines frame border by a frame header padded with specific characters, GFP adapts the frame positioning method in Asynchronous Transfer Mode (ATM) and employs a Header Error Check (HEC)-based self-description technology to determine frame border by two-byte of the current frame for payload length and two-byte of the current frame for HEC. Therefore, it overcomes defects in the frame positioning which depends on a frame tag and is suitable for high speed processing. Since the frame header in GFP is also a payload length indicator, the GFP frame encapsulation may be in a flexible form and support data in fixed or variable length, and can completely encapsulate the user's Protocol Data Units (PDUs) in variable length. Therefore, it avoids data parsing, restructuring and frame padding, simplifies operations, and improves system processing speed and stability.

Another feature of GFP is the introduction of IDLE frame: in the case that GFP doesn't receive any data from the service side, it will create an IDLE frame to solve the problem of mismatch between the service data rate and the data rate of lower transport service layer, and thereby avoid any limitation to the byte synchronous transmission on lower layer or the data service on upper layer. The IDLE frame feature of GFP makes it applicable to adaptation from any service to any byte synchronous stream when it is used as an adaptation layer (of course, the transmission bandwidth for byte synchronous stream on lower layer must be wider than that required by the service on upper layer), and reduces complexity resulted from FLAG byte application in Point to Point Protocol (PPP) and Link Access Procedure-SDH (LAPS). That feature is the basic reason why GFP is now widely applied.

In another aspect, to solve the problem regarding wavelength utilization, in a Wavelength Division Multiplexing (WDM) system, the conventional Optical Transponder Unit (OTU) used for point-to-point optical connections has been replaced by an optical transponder unit with multiplexing or add/drop multiplexing function. Although multiplexing multiple services to a single wavelength for transmission can improve wavelength utilization, such an application is still in a point to point application model, in which the wavelength utilization can be improved by service multiplexing only when there are multiple services between two points. However, such an application mode is rarely seen in practice.

In the applicant's Chinese patent application no. 200310121902.2 and entitled "Method for Improving Wavelength Utilization", a method for improving wavelength utilization in WDM system by means of add/drop multiplexing is put forward. At present, there are two ways to implement add/drop multiplexing: Virtual Container (VC) and GFP Channel ID (CID). The VC method is to utilize the above-mentioned GFP or another similar adaptation protocol (e.g., PPP or LAPS) to encapsulate an upper layer service into virtual containers and then perform add/drop multiplexing on the VCs to implement add/drop multiplexing for the service. For example, a Gigabyte Ethernet (GE) signal can be encapsulated in GFP into a Virtual Concatenation Group (VCG) including 8 VC4s; then, those VCs are multiplexed into Synchronous Transfer Mode-N (STM-N) frames; at the destination node, the VCs are treated by add/drop multiplexing, so that the Add Drop Multiplexer (ADM) for the GE signal is implemented. For example, STM-16 data can be encapsulated into an Optical Data Unit of level 1 (ODU1); then, 4 ODU1s can be encapsulated into an ODU2; by treating the ODU1s through add/drop multiplexing, an STM-16 ADM function can be implemented. Compared with the VC method, GFP CID method is simpler. For example, before GEs are encapsulated into ODU1 frames, they are encapsulated into GFP frames first; by assigning different CIDs to different GEs and treating the GEs with different CIDs in different ways at the destination node (for example, a GFP frame with a CID identical to the GE to be dropped at the destination node is terminated at the node and dropped, and a GFP frame with a CID different from the GE to be dropped at the destination node will pass through that node and be transferred to the next node in the original direction), so as to implement the add/drop multiplexing for GEs.

Though both the above VC method and GFP CID method can implement ADM operations for services, they have their drawbacks respectively. In the VC method, separate VCs are assigned to each service. No matter whether a service makes full use of the corresponding VC bandwidth, the VC bandwidth is reserved for the service. According to a carrier's network including multiple GE ADMs, the typical bandwidth utilization for each GE is about 30%. Therefore, the bandwidth reserved for each GE is actually wasted and can not be used for other services. Though the VC bandwidth occupied by each service can be adjusted (e.g., a GE required 8 VC4s originally but now is adjusted to have 4 VC4s), that method has poor flexibility in that it can not provide enough bandwidth to GE services on upper layer at peak traffic times and also reduces the traffic through GE ports of routers on upper layer in disguised form, and the service capability of upper layer equipments are not fully utilized. Furthermore, the method of reducing VC bandwidth does not attain the purpose of utilizing "peak-valley effect" among the services to balance traffic demands among the services and implement statistical multiplexing. Though the GE ADM implemented with the GFP CID method enables multiple GE services to share the physical bandwidth of the same bearer pipe, the drawback of the GFP CID method is apparent, because the traffic for each GE is unpredictable and no traffic control mechanism is defined in GFP, and the existing implementation method actually reserves bandwidth for the sum of the respective peak traffics of GEs in the lower layer bearer pipe. Though the method simplifies the implementation of GE ADM, it reduces bandwidth bearing efficiency at individual wavelengths.

SUMMARY OF THE INVENTION

In view of the drawbacks in the above methods for implementation of multiplexing, the embodiments of the present invention provide a new add/drop multiplexing method and system, which can implement statistical add/drop multiplexing for multiple data services in various types, improve bandwidth utilization, and are applicable to implementation of statistical ADM for a variety of data services in burst mode, even mixed statistical ADM for multiple services.

According to an embodiment of the present invention, there is provided a Generic Framing Procedure (GFP)-based statistical add/drop multiplexing method for Gigabyte Ethernet (GE). The method includes: multiplexing, in GFP, multiple GE connections among multiple nodes to a byte synchronous interface for transmission, wherein a bandwidth of the byte synchronous interface is smaller than a sum of peak bandwidths of the group of multiple GE connections borne on the byte synchronous interface; performing, by means of buffers, a statistical multiplexing on effective data borne on the multiple GEs; and treating, according to a congestion processing mechanism, the payloads in the case of network congestion.

Optionally, the method further includes: defining a Channel ID (CID) in a GFP frame; determining, according to the CID, whether data being received by a current node are targeted to the current node; in the case that the data are targeted to the current node, receiving the data; otherwise storing the data transferred through the current code into the buffers.

Optionally, the method further includes: defining a priority identification in a GFP frame, and controlling, according to the priority identification, a service transmission sequence for the buffers to form the congestion processing mechanism.

Optionally, the priority processing mechanism includes defining a priority identification which may be a static priority identification assigned by GE port or a priority identification dynamically assigned by type of services borne on the GEs.

Optionally, the number of the network nodes is two or more.

Optionally, the number of the buffers is greater than or equal to the number of defined priorities; and data with different priorities are stored in different buffers.

Optionally, idle frames for synchronizing data are multiplexed and mapped to a corresponding byte synchronous interface if no more intact data frame of service data in the buffer, or the idle frames are directly put into a buffer queue instead of being multiplexed.

Optionally, the byte synchronous interface includes virtual container, optical data unit, virtual concatenation group of virtual containers, virtual concatenation group of optical data units, Synchronous Digital Hierarchy (SDH), Synchronous Optical Network (SONET) and Optical Transport Network (OTN).

Optionally, the method further includes: in the case of network congestion, transferring services with high priorities in precedence, and discarding services with lower priorities.

According to another embodiment of the present invention, there is provided a GFP-based GE statistical add/drop multiplexing apparatus. The apparatus includes:

a line synchronous receiving unit, adapted to combine a variety of upstream byte synchronous interfaces into a unified byte synchronous interface;

a buffer, adapted to store GFP data packets with different priorities;

a line payload abstraction unit, adapted to abstract effective GFP data packets from synchronous receiving signals output by the line synchronous receiving unit and divert the effective GFP data packets according to GFP Channel IDs (CIDs) and priority identifications in the GFP data packets, transfer signals to be terminated locally to a local decapsulation and data adaptation unit, and put other signals into different buffer queues according to the priority identifications;

at least one local decapsulation and data adaptation unit, adapted to terminate data in the GFP data packets to be terminated locally from the line payload abstraction unit, recover GE signals, and transfer the signals downward to a service device;

at least one local add GE signal adaptation and encapsulation unit, adapted to abstract payloads in local add GE signals, assign appropriate priorities to the payloads, and then encapsulated the payloads into appropriate GFP data packets and put the GFP data packets into corresponding buffer queues;

a scheduling unit, adapted to perform scheduling on contents in the buffer according to a scheduling strategy;

a GFP idle frame generator, adapted to generate GFP idle frames;

an adaptation unit, adapted to multiplex and map signals from the scheduling unit and the GFP idle frames from the GFP idle frame generator to an appropriate byte synchronous interface;

a sending unit, adapted to send synchronous signals generated by the adaptation unit to a downstream node, and multiplex, in GFP, multiple GE connections among multiple nodes to a unified byte synchronous interface for transmission, wherein a bandwidth of the byte synchronous interface is smaller than a sum of peak bandwidths of the group of the multiple GE connections borne on the byte synchronous interface;

the line synchronous receiving unit is coupled to the line payload abstraction unit;

the line payload abstraction unit is coupled to the local decapsulation and data adaptation unit and the local add GE signal adaptation and encapsulation unit, respectively;

the local add GE signal adaptation and encapsulation unit is coupled to the buffer;

the buffer is coupled to the scheduling unit;

the scheduling unit is coupled to the adaptation unit;

the GFP idle frame generator is located between the buffer and the adaptation unit;

the adaptation unit is coupled to the sending unit.

Optionally, the GFP idle frames from the GFP idle frame generator together with the signals from the scheduling unit are multiplexed and mapped to appropriate byte synchronous interfaces by the adaptation unit; or the GFP idle frames from the GFP idle frame generator are put into the buffer queues by the GFP idle frame generator and then are directly output by the adaptation unit.

Optionally, the line synchronous receiving unit is in form of concatenation or virtual concatenation.

Optionally, the local decapsulation and data adaptation unit is also adapted to terminate client data management frames.

Optionally, the local add data adaptation and encapsulation unit is capable of creating a client data management frame, assigning an appropriate priority to the frame, and then putting the frame into a corresponding buffer queue.

Optionally, the adaptation unit maps in form of concatenation or virtual concatenation the multiplexed GFP data packets to one or more byte synchronous interfaces.

According to another embodiment of the present invention, there is provided a GFP-based GE statistical add/drop multiplexing system. The system includes: one or more line synchronous receiving interface unit, adapted to terminate synchronous digital hierarchy/synchronous optical network/optical transport network signals and demultiplex the signals; a synchronous or asynchronous crossing unit, adapted to perform crossing on virtual containers or optical data units; one or more payload abstraction unit, adapted to abstract effective data in GFP data packets from synchronous signals sent by one or more virtual containers or optical data units; a GFP data packet buffer, containing multiple buffer queues corresponding to different priorities; one or more data service adaptation unit, adapted to perform client-side data service adaptation, abstract effective data service data, assign appropriate priorities to the effective data, and accomplish encapsulation of GFP data packets; a propriety scheduling and adaptation unit, adapted to manage the buffer queues and map data in the GFP data packets from the buffer to one or more virtual containers or optical data units; an idle frame generator, adapted to generate idle frames in GFP data packets, wherein the idle frames are put into a buffer queue with a lowest priority or directly transmitted to the priority scheduling unit for accomplishing rate adaptation between a GFP layer and a synchronous layer; one or more line synchronous sending interface unit, adapted to accomplish multiplexing and framing of the virtual containers and optical data units and then send resulting frames;

the line synchronous receiving interface unit is coupled to the synchronous or asynchronous crossing unit;

the synchronous or asynchronous crossing unit is coupled to the payload abstraction unit and the priority scheduling and adaptation unit, respectively;

the GFP data packet buffer is coupled to the payload abstraction unit and the priority scheduling and adaptation unit, respectively;

the idle frame generator is located between the priority scheduling and adaptation unit and the GFP data packet buffer;

the GFP data packet buffer is coupled to the GE adaptation unit;

the GE adaptation unit is coupled to the line synchronous sending interface unit.

Optionally, the line synchronous receiving interface unit is in form of concatenation or virtual concatenation.

Optionally, the GE adaptation unit is also adapted to terminate client data management frames.

Optionally, the GE adaptation unit is adapted to create client data management frames, assign appropriate priorities to the frames, and put the frames into corresponding buffer queues.

Optionally, the GE adaptation unit maps in form of concatenation or virtual concatenation the multiplexed GFP data packets to one or more byte synchronous interfaces According to another embodiment of the present invention, there is provided a GFP-based add/drop multiplexing method. The method includes: multiplexing, through a GFP processing, multiple data service connections in different types among multiple nodes to a byte synchronous interface for transmission, wherein a bandwidth of the byte synchronous interface is smaller than a sum of peak bandwidths of the group of data connections borne on the byte synchronous interface; performing, by means of buffers, a statistical multiplexing on payloads borne on the interfaces of the multiple data services in various types; and treating, by priority, the payloads in the case of network congestion.

Optionally, the number of the network nodes is two or more.

Optionally, the data service must be data services in burst mode, and a network for the data services in burst mode includes GE, Fast Ethernet (FE), Fiber Channel (FC) and Enterprise Connection (ESCON).

Optionally, the priority may be a static priority identification assigned by service port, or a priority identification dynamically assigned by type of service borne on service port.

Optionally, idle frames of the synchronous data are multiplexed and mapped to a corresponding byte synchronous interface, or directly put into a buffer queue without being multiplexed.

Optionally, the byte synchronous interface includes virtual container, optical data unit, Virtual Concatenation Group (VCG) of virtual containers, virtual concatenation group of Optical Data Units (ODUs), Synchronous Digital Hierarchy (SDH), Synchronous Optical Network (SONET) and Optical Transport Network (OTN).

According to another embodiment of the present invention, there is provided a GFP-based add/drop multiplexing apparatus. The apparatus includes: a line synchronous receiving unit, which can combine a variety of upstream byte synchronous interfaces into a unified byte synchronous interface; a plurality of buffers, adapted to store GFP data packets with different priorities; a line payload abstraction unit, which can abstract effective GFP data packets from synchronous receiving signals output by the line synchronous receiving unit, and divert the effective GFP data packets according to GFP Channel IDs (CIDs) and priority identifications in the GFP data packets, such that signals to be terminated locally are transferred to a local decapsulation and data adaptation unit, and other signals are put into different buffer queues according to the priority identifications; one or more local decapsulation and data adaptation unit, adapted to terminate data in the GFP data packets to be terminated locally from the line payload abstraction unit, recover GE signals, and transfer the signals downward to a service device; one or more local add data signal adaptation and encapsulation unit, adapted to abstract payloads in local add data signals, assign appropriate priorities to the payloads, and then encapsulated the payloads into appropriate GFP data packets and put the GFP data packets into corresponding buffer queues; a scheduling unit, adapted to perform scheduling on contents in the buffer according to a scheduling strategy; a GFP idle frame generator, adapted to generate GFP idle frames; an adaptation unit, adapted to multiplex and map signals from the scheduling unit and the GFP idle frames from the GFP idle frame generator to an appropriate byte synchronous interface; a sending unit, adapted to send synchronous signals generated by the adaptation unit to a downstream node;

the line synchronous receiving unit is coupled to the line payload abstraction unit;

the line payload abstraction unit is coupled to the local decapsulation and data adaptation unit and the local add data adaptation and encapsulation unit, respectively;

the local add data adaptation and encapsulation unit is coupled to the buffers;

the buffers are coupled to the scheduling unit;

the scheduling unit is coupled to the adaptation unit;

the GFP idle frame generator is located between the buffers and the adaptation unit;

the adaptation unit is coupled to the sending unit.

Optionally, the GFP idle frames from the GFP idle frame generator together with the signals from the scheduling unit are multiplexed and mapped to appropriate byte synchronous interfaces by the adaptation unit; or the GFP idle frames from the GFP idle frame generator are put into the buffer queues by the GFP idle frame generator and then are directly output by the adaptation unit.

Optionally, the line synchronous receiving unit is in form of concatenation or virtual concatenation.

Optionally, the local decapsulation and data adaptation unit is also adapted to terminate client data management frames.

Optionally, the local add data adaptation and encapsulation unit is capable of creating a client data management frame, assigning an appropriate priority to the frame, and then putting the frame into a corresponding buffer queue.

Optionally, the adaptation unit maps in form of concatenation or virtual concatenation the multiplexed GFP data packets to one or more byte synchronous interfaces.

Optionally, the local decapsulation and data adaptation unit and the local add data adaptation and encapsulation unit provide adaptation for data in a network or a connection including Ethernet, Gigabyte Ethernet (GE), Fast Ethernet (FE), Fiber Channel (FC), Enterprise Connection (ESCON) and Fiber Connection (FICON).

According to another embodiment of the present invention, there is provided a GFP-based add/drop multiplexing system for multiple data services in various types. The system includes:

at least one line synchronous receiving interface unit, adapted to terminate Synchronous Digital Hierarchy (SDH)/Synchronous Optical Network (SONET)/Optical Transport Network (OTN) signals and demultiplex the signals;

a synchronous or asynchronous crossing unit, adapted to perform virtual crossing on virtual containers or optical data units;

one or more payload abstraction unit, adapted to abstract effective data in GFP data packets from synchronous signals sent by one or more virtual containers or optical data units;

a GFP data packet buffer, containing multiple buffer queues corresponding to different priorities;

at least one data service adaptation unit, adapted to perform client-side adaptation on a variety of data services, abstract effective data from the variety of data services, assign appropriate priorities to the effective data, and accomplish encapsulation of GFP data packets;

a propriety scheduling and adaptation unit, adapted to manage the buffer queues and map data in the GFP data packets from the buffer to one or more virtual containers or optical data units;

an idle frame generator, adapted to generate idle frames in GFP data packets, wherein the idle frames may be put into a buffer queue with a lowest priority or directly transmitted to the priority scheduling unit for accomplishing rate adaptation between a GFP layer and a synchronous layer;

at least one line synchronous sending interface unit, adapted to accomplish multiplexing and framing of the virtual containers and optical data units and then send resulting frames;

the line synchronous receiving interface unit is coupled to the synchronous or asynchronous crossing unit;

the synchronous or asynchronous crossing unit is coupled to the payload abstraction unit and the priority scheduling and adaptation unit, respectively;

the GFP data packet buffer is coupled to the payload abstraction unit and the priority scheduling and adaptation unit, respectively;

the idle frame generator is located between the priority scheduling and adaptation unit and the GFP data packet buffer;

the GFP data packet buffer is coupled to the data adaptation unit for a variety of data services;

the data adaptation unit for a variety of data services is coupled to the line synchronous sending interface unit.

Optionally, the line synchronous receiving interface unit is in form of concatenation or virtual concatenation.

Optionally, the data adaptation unit for a variety of data services is also adapted to terminate client data management frames.

Optionally, the data adaptation unit for a variety of data services is also adapted to create client data management frames, assign appropriate priorities to the frames, and put the frames into corresponding buffer queues.

Optionally, the data adaptation unit for a variety of data services maps in form of concatenation or virtual concatenation the multiplexed GFP data packets to one or more byte synchronous interfaces.

Optionally, the data adaptation for a variety of data services refers to adaptation of network data in network or connections including but limited to Ethernet, Gigabyte Ethernet (GE), Fast Ethernet (FE), Fiber Channel (FC), Enterprise Connection (ESCON) and Fiber Connection (FICON).

The embodiments of the present invention have the following benefits: compared with a pure transparent multiplexing method, the statistical multiplexing method can improve bandwidth utilization, without limiting the demand of the services for peak bandwidths. According to the embodiments of the invention, data rate adaptation and statistical multiplexing are implemented uniformly over GFP, thus reducing the complexity in the implementation. In addition, statistical add/drop multiplexing for multiple data services in various types is achieved.

DETAILED DESCRIPTION OF THE EMBODIMENTS

Hereunder the embodiments of the present invention will be described in conjunction with the accompanying drawings.

An implementation method of a statistical ADM for GE according to an embodiment of the present invention is implemented by adding buffers in a node. Theoretically, as long as the average bandwidth of multiplexed effective data borne on GE does not exceed the bandwidth available on the bearer layer and the buffer is large enough, statistical add/drop multiplexing for the group of GEs can be implemented over a byte synchronous interface link with a bandwidth smaller than the sum of peak bandwidths of the GEs. However, in actual implementation, being limited by cost, the buffer can not be infinitely large. As a result, congestion may occur when peak data volumes happen in multiple GE services at the same time. To solve that problem, a congestion processing mechanism is required in implementation of the statistical ADM for GE, in order to ensure normal operation of the network.

Figure 1:
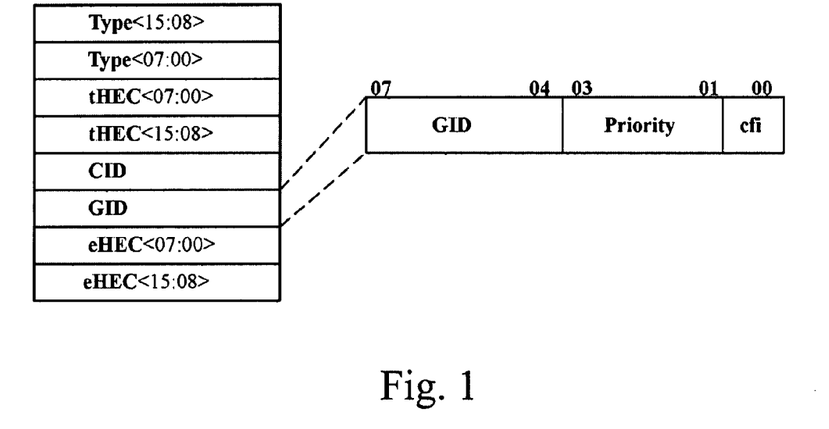
FIG. 1 is a schematic diagram illustrating a linear type frame header extension method according to an embodiment of the present invention.

In GFP, extended frame headers are defined besides IDLE frame, which include empty extended frame header, linear type extended frame header and ring type extended header. The empty extended frame header virtually means that there is no extended frame header. The ring type extended frame header is mainly reserved for resilient packet ring (RPR) network defined in IEEE 802.17, and is not defined yet. The linear type extended frame header includes two bytes. At present, only the first byte in the linear type extended frame header is defined as CID, which is adapted to differentiate multiple services; the other byte is not defined yet. The embodiments of the present invention propose a definition for the idle byte in the GFP linear type extended frame header, as shown in FIG. 1. The linear type extended frame header is extended by introducing GID, priority identification and rule frame identification into the header.

According to an embodiment of the present invention, the definition of the idle byte in the GFP linear type extended frame header utilizes the added priority byte to process different services by priority, which can ensure normal operation of the network in the case of network congestion. The priority mechanism, together with the buffers and the congestion processing mechanism described above, implements statistical add/drop multiplexing for GE, i.e., GFP-based statistical ADM for GE.

Figure 2:
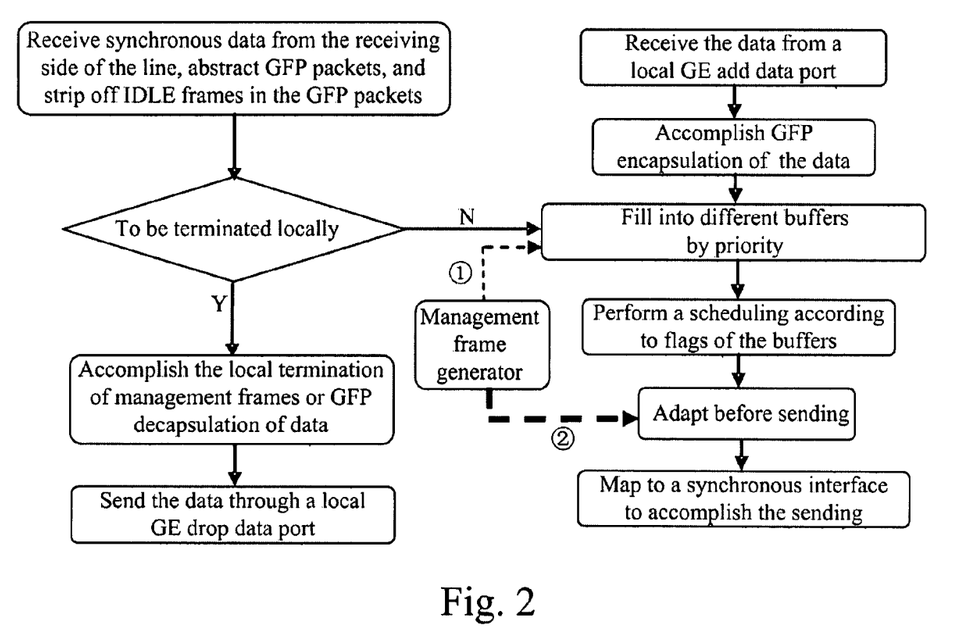
FIG. 2 is a flow chart illustrating an implementation method of a statistical ADM for GE according to an embodiment of the present invention.

FIG. 2 shows a typical process for implementing a statistical ADM for GE, i.e., a GFP-based statistical add/drop multiplexing method for Gigabyte Ethernet. In the method, multiple GE connections among multiple nodes are multiplexed in GFP to a byte synchronous interface for transmission. The bandwidth of the byte synchronous interface is smaller than the sum of peak bandwidths of the group of multiple GE connections borne on the interface. For the multiple GE connections, statistical multiplexing is performed on the effective data with a buffer, and the effective data are treated according to a congestion processing mechanism in the case of network congestion.

Data from upstream is received at the byte synchronous interface on the receiving side of a byte synchronous line. GFP data packets are abstracted from the data by demultiplexing. IDLE frames are stripped off from the GFP data packets. Then the effective GFP data are diverted, such that the management frames or the data frames to be dropped locally are delivered to a local dropping interface for termination and the data not to be dropped locally are filled into different buffers according to the priority content in the linear type extended frame headers. Meanwhile, the data to be added locally are assigned with appropriate priorities depending on service nature, and are filled into different buffers by priority after GFP encapsulation. In the encapsulation process, appropriate service management frames can be created for service control according to the situation of local services. On the sending side of the line, there is a scheduling unit which performs scheduling on the buffer contents according to a predefined scheduling mechanism, to implement transmission of GFP data packets with different priorities. The scheduling mechanism can be: transmitting the data with lower priorities only when there is no data in buffers with higher priorities, or performing scheduling according to a preset flag bit in each buffer. Due to the fact that there may be no data borne on the line, GFP has to accomplish data adaptation with a synchronous side of the line. Therefore, GFP creates IDLE frames which can be put into the buffer with the lowest priority or into a separate buffer specially provided for GFP IDLE frames, and be assigned with a lowest priority, so as to accomplish the data adaptation process (as process (1) in FIG. 2); or, the IDLE frames can be inserted in the adaptation process before the data in the multiple service buffers are sent (as process (2) in FIG. 2). With the method, statistical add/drop multiplexing for GE can be realized over GFP. The above method is also applicable to statistical add/drop multiplexing for a node with multiple GEs. In that case, different GEs can be assigned with respective combined identifications from CIDs and GIDs; in local drop direction, separate treatments are performed for each of the combined identifications from CIDs and GIDs.

Since in the statistical add/drop multiplexing provided in GFP for each GE service, only the case that the GFP bandwidth is not enough will occur but overload at GE drop ports will not occur, no complex buffer processing is required on drop side. Furthermore, the prioritization described in the method can be assigning different priorities to different GE ports, or prioritizing according to the services borne on GE (in a view of actual application, prioritization according to the services borne on GE is more preferred).

Figure 3:
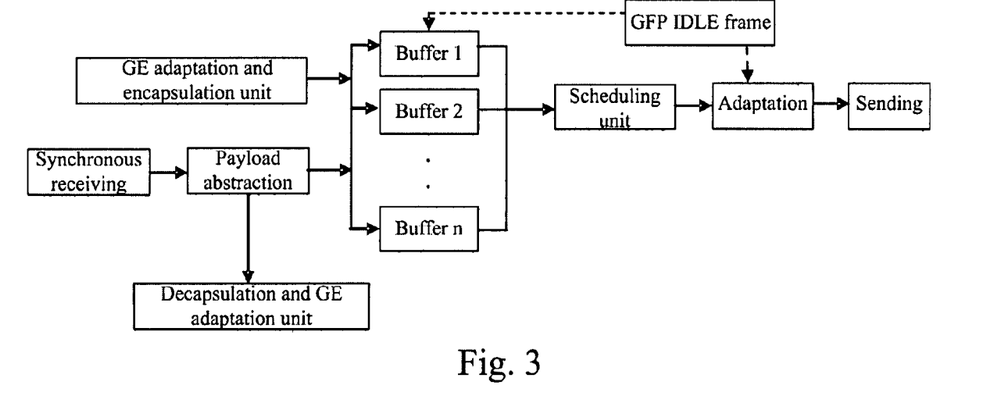
FIG. 3 is a schematic diagram illustrating a statistical ADM according to an embodiment of the present invention.

FIG. 3 is a schematic diagram of an embodiment of the present invention. FIG. 3 shows a GFP-based statistical add/drop multiplexing apparatus for GE. As shown in FIG. 3, the apparatus includes: a line synchronous receiving unit, adapted to combine a variety of upstream byte synchronous interfaces into a unified byte synchronous interface; a line payload abstract unit, adapted to abstract effective GFP data packets from synchronous receiving signals output by the line synchronous receiving unit, and divert the effective GFP data packets according to CIDs and priority identifications in the GFP data packets, such that the data to be terminated locally are transmitted to a local decapsulation and GE adaptation unit and other data are put into different buffer queues according to the priority identifications; one or more local decapsulation and GE adaptation units, adapted to terminate the data in the GFP data packets to be terminated locally from the line payload abstraction unit, recover GE signals, and transfer the GE signals downward to a service device; one or more local add GE signal adaptation and encapsulation units, adapted to abstract payloads in local add GE signals, assign appropriate priorities to the payloads, and then encapsulate them into appropriate GFP data packets and put the GFP data packets into corresponding buffer queues; at least one buffer, adapted to store GFP data packets with different priorities; a scheduling unit, adapted to perform scheduling on contents in the buffers with a scheduling strategy; a GFP idle frame generator, adapted to generate GFP idle frames; an adaptation unit, adapted to multiplex signals from the scheduling unit and the GFP idle frames from the GFP idle frame generator, and map them to appropriate byte synchronous interfaces; a sending unit, adapted to send synchronous signals from the adaptation unit to a downstream node, and multiplex multiple GE connections among multiple nodes in GFP to a unified byte synchronous interface for transmission, wherein a bandwidth of the byte synchronous interface is smaller than a sum of peak bandwidths of the group of multiple GE connections borne on the byte synchronous interface.

The ADM function is embodied in that: the synchronous receiving unit receives upstream service signals, demultiplexes the signals and strips off IDLE frames to obtain the GFP payloads; GFP payloads to be terminated locally will be transmitted to the local decapsulation and GE adaptation unit to accomplish service signal downloading; GFP payloads that are not to be terminated locally will be filled into different buffers by priority; accordingly, local add services are assigned with appropriate priorities according to a certain strategy during the GFP encapsulation process and are filled into corresponding buffers; next, the two streams are multiplexed together and sent downstream via the synchronous sending side of the line; and the entire add/drop multiplexing function is completed. The statistical function is embodied in that: different buffers correspond to different priorities; Buffer1 is designated as the buffer with a lowest priority; the scheduling unit treats the GFP payloads in different buffers in different ways according to a predefined priority strategy, and thereby accomplishes priority-based statistical multiplexing operations. GFP IDLE frames can be added as required when the effective GFP frames are adapted with the byte synchronous stream after being multiplexed, or be inserted into a buffer with the lowest priority and then the buffer with the lowest priority is treated in a different way by using the scheduling unit.

Figure 4:
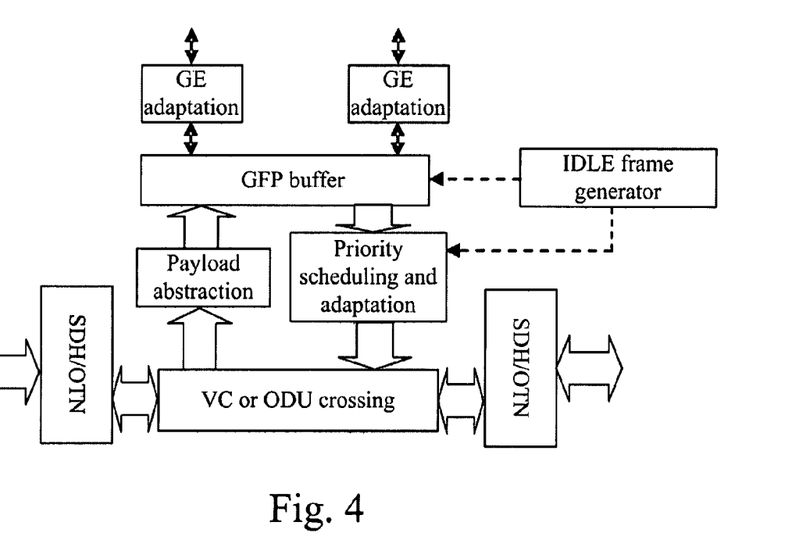
FIG. 4 illustrates an architecture diagram illustrating a statistical ADM system for GE according to an embodiment of the present invention.

According to an embodiment of the present invention, a system architecture that can be implemented with the above apparatus is shown in FIG. 4. The embodiment of the present invention can not only improve wavelength utilization in a WDM system but also improve link bandwidth utilization in a Synchronous Digital Hierarchy (SDH)/Synchronous Optical Network (SONET) equipment. The GFP-based statistical add/drop multiplexing system for GE shown in FIG. 4 includes: at least one line synchronous receiving interface unit, adapted to terminate SDH/SONET/Optical Transport Network (OTN) signals and demultiplex the signals; a synchronous or asynchronous crossing unit, adapted to perform crossing on virtual containers or optical data units; at least one payload abstraction unit, adapted to abstract effective data in GFP data packets from synchronous signals sent by one or more virtual containers or optical data units; a GFP data packet buffer, containing multiple buffer queues corresponding to different priorities; at least one GE adaptation unit, adapted to perform client-side GE adaptation, abstract effective GE data, assign appropriate priorities to the effective GE data, and then accomplish GFP-based data encapsulation; a priority scheduling and adaptation unit, adapted to manage the buffer queues and map the GFP data packets from the buffer to one or more virtual containers or optical data units; an idle frame generator, adapted to generate idle frames for GFP data packets, which can be put into a buffer queue with the lowest priority or directly transmitted to the priority scheduling unit to accomplish data rate adaptation between the GFP layer and the synchronous layer; at least one line synchronous sending interface unit, adapted to accomplish multiplexing and framing of the virtual containers and optical data units and send the resulting frames.

In FIG. 4, after the optical signals from an optical link are received by a receiver and the frame format is converted, the virtual containers (VCs) or the optical data units (ODUs) are abstracted and are fed to a cross matrix. Since not all bandwidth of the link is allocated to the GE ADM, a part of the bandwidth may be used for a normal ADM. Of course, there may be a case that a single waveband cannot meet the demand of the GE ADM, and multiple wavebands are required to be concatenated to meet the demand of the GE ADM for bandwidth. In that case, virtual concatenation of VCs or virtual concatenation of ODUs is needed to meet the demand for bandwidth. After the VCs and the ODUs enter into the cross matrix of the system, only the VCs or the ODUs that are used to bear GE services will be combined, and the GFP payloads (the collection of GFP data packets with IDLE frames stripped off) in the combination will be abstracted. Then, the payloads are delivered to the buffer or the local termination unit (GE adapter), depending on whether the payloads are to be terminated locally or not. In the GE adapter, GFP decapsulation and service restoration are accomplished. In the other direction, after being subjected to GE adaptation (including GFP encapsulation), local add services are filled into the same buffer. Next, through the same priority scheduling and adaptation process, they are mapped into VCs and ODUs, and then assembled into SDH/SONET/OTN frames and sent to a downstream site. In the above process, the GFP IDLE frames are used to adjust the data rate adaptation process, as shown in FIG. 3.

Figure 5:
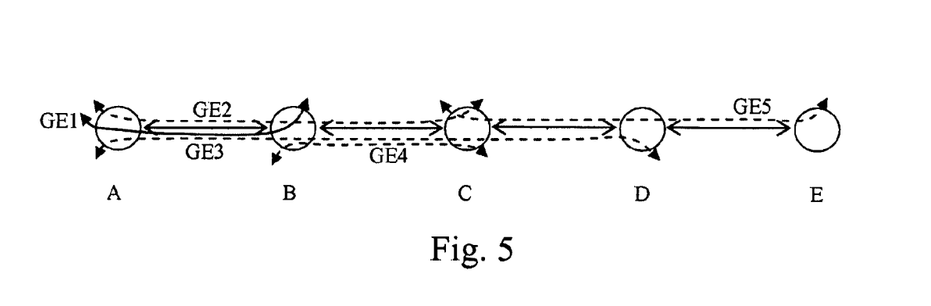
FIG. 5 is a schematic diagram of add/drop multiplexing for GE.

In order to make the purpose of the present invention understood better, hereunder an embodiment of the present invention is described with an example, as shown in FIG. 5. Supposing nodes A, B, C, D and E form a chain by using a waveband. In the chain, there is a GE connection between A and B, between A and C, between A and D, between B and C, and between C and E, respectively, referred to as GE1, GE2, GE3, GE4 and GE5, and there is only a 2.5 G STM-16 or OTN2 connection between A, B, C, D and E, respectively (lower bandwidth can exhibit the benefit of the statistical ADM better). It is seen that there are three GE connections, i.e., GE1, GE2 and GE3, between A and B, and three GE connections, i.e., GE2, GE3 and GE4, between B and C. For a normal application, the link between A and B and that between B and C can not bear such an application. However, actually, GE1, GE2, GE3 and GE4 are not 100% used to bear data at all times; therefore, statistical multiplexing for multiple GEs can be realized by means of peak-valley counterbalance effect among the multiple GEs; in addition, at nodes B and C, by configuring the above statistical add/drop multiplexing function, statistical add/drop multiplexing for multiple GEs at multiple sites can be realized, thus attaining the purpose of improving bandwidth utilization. In the case that the peaks of data borne on the GEs meet each other and the buffers in the nodes are congested, the congestion can be controlled by discarding data packets with lower priorities at nodes B and C.

The method according to an embodiment of the present invention is not only applicable to GEs, but also applicable to any data service in burst mode, such as Ethernet (Eth), FE, ESCON, FICON, Fiber Distributed Data Interface (FDDI) and FC services, etc, so as to implement a statistical add/drop multiplexer for those services in burst mode and even to implement a statistical add/drop multiplexer for multiple data services in various types. Those data services may not always carry data at all times. In idle time, inter-packet gaps (IPGs) or idle frames can be inserted into the data services. If those services are transmitted in existing SONETs or up-coming OTNs in a traditional manner, bandwidth still has to be reserved for peak traffic of each service. As a result, the actual transmission efficiency will be low. However, with the method according to an embodiment of the present invention, that problem can be solved.

Figure 6:
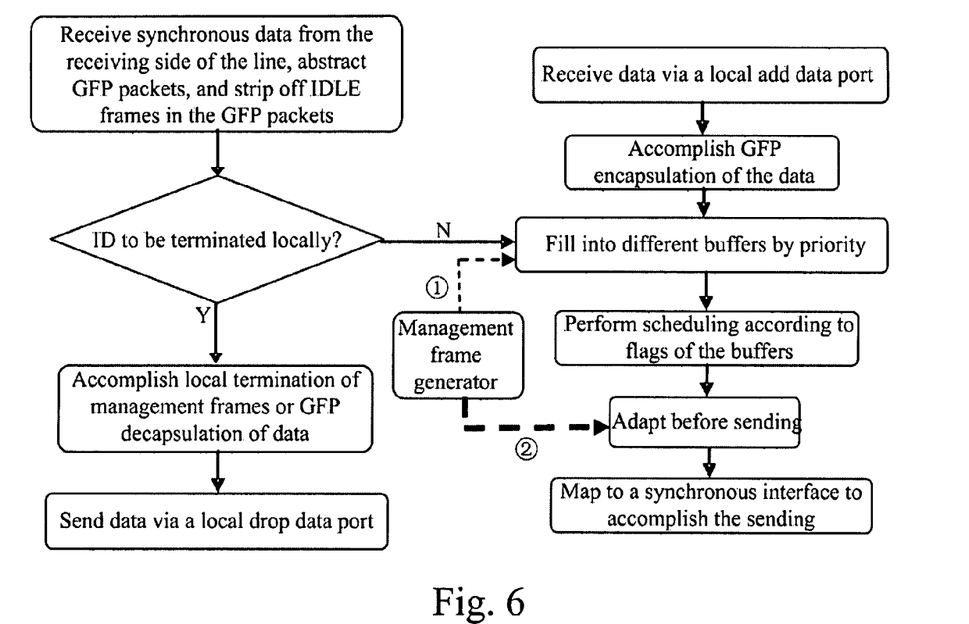
FIG. 6 is a flow chart of statistical add/drop multiplexing according to an embodiment of the present invention.

FIG. 6 shows a method for implementing a statistical ADM for any service. It is a GFP-based add/drop multiplexing method for multiple data services in various types. In the method, multiple data service connections in various types among multiple nodes are multiplexed through a GFP processing to a byte synchronous interface for transmission. A bandwidth of the byte synchronous interface is smaller than a sum of peak bandwidths of the group of data connections borne on the byte synchronous interface. Statistical multiplexing is carried out on the payloads borne on the multiple data services in different types by means of buffers. A priority processing mechanism is used in the case of network congestion.

In FIG. 6, the method for implementing a statistical ADM for any service only requires to modify the adaptation process on service side, that is, the adaptation on service side covers not only GE, but also Eth, FE, FDDI, ESCON, FICON and FC, etc. The priorities of different services can be assigned by service port or protocol type, or by the type of a service borne on a data port (for example, QoS definition is available in IP services over FE, and the GFP encapsulation process can continue to use the definition). However, the priorities must be included in priority identifications in GFP linear type extended frame headers. In that way, mixed statistical add/drop multiplexing for multiple data services in various types can be realized.

Figure 7:
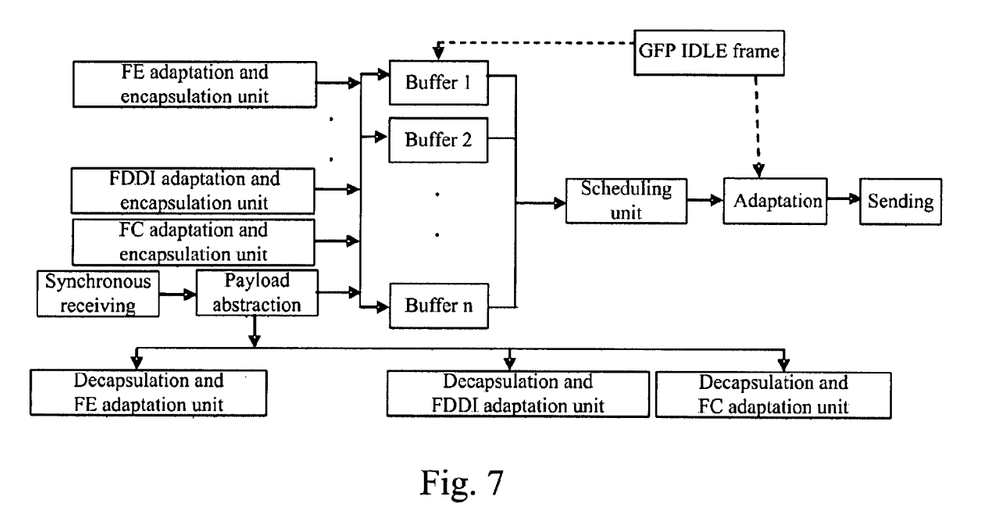
FIG. 7 is a structural diagram of a statistical add/drop multiplexing apparatus according to an embodiment of the present invention.

Accordingly, an apparatus for implementing a statistical ADM for any service is shown in FIG. 7. The GFP-based add/drop multiplexing apparatus for multiple data services in various types shown in FIG. 7 includes: a line synchronous receiving unit, adapted to combine upstream byte synchronous interfaces into a unified byte synchronous interface; a line payload abstraction unit, adapted to abstract effective GFP data packets from synchronous signals output by the line synchronous receiving unit, and divert the effective GFP data packets according to CIDs and priority identifications in the GFP data packets, that is, transmit the signals to be terminated locally to a local decapsulation and data adaptation unit, and put other signals into different buffer queues according to the priority identifications; at least one local decapsulation and data adaptation unit, adapted to terminate the data in the GFP data packets to be terminated locally from the line payload abstraction unit, recover the data signals and send the data signals downward to a service device; at least one local add data signal adaptation and encapsulation unit, adapted to abstract payloads in the local add data signals, assign appropriate priorities to the payloads, and then encapsulate them into appropriate GFP data packets and put the GFP data packets into corresponding buffer queues; at least one buffer, adapted to store GFP data packets with different priorities; a scheduling unit, adapted to schedule contents in the buffers with a scheduling strategy; a GFP idle frame generator, adapted to generate GFP idle frames; an adaptation unit, adapted to multiplex and map the signals from the scheduling unit and the GFP idle frames from the GFP idle frame generator to appropriate byte synchronous interfaces; a sending unit, adapted to send the synchronous signals generated by the adaptation unit to an downstream node.

FIG. 7 shows an embodiment of a statistical ADM for multiple services in various types. Data from an upstream site are received, and payloads are abstracted from the data and diverted according to whether they are to be terminated locally or not. Payloads to be terminated locally are transmitted to appropriate local termination units according to CIDs and GIDs to accomplish GFP decapsulation and service type adaptation process, so as to accomplish the data packet transmission process. GFP packets not to be terminated locally are put into different buffers according to priority identifications in GFP linear extended frame headers. Different types of data added locally are adapted by corresponding adaptation units, and effective data packets are abstracted from those data; then, the data packets are assigned with different priorities according to a corresponding prioritization strategy, encapsulated in GFP, and put into different buffers by priority; next, the GFP packets in the buffers are combined by the scheduling unit according to an appropriate scheduling strategy and are adapted to corresponding synchronous sending sequences and finally sent to the next node. During the adaptation process, GFP IDLE frames are used for data rate adaptation in the same way as that used in the statistical ADM for GE application process. Through a series of processing procedures as described the above, the statistical add/drop multiplexing for multiple services in various types is realized.

Figure 8:
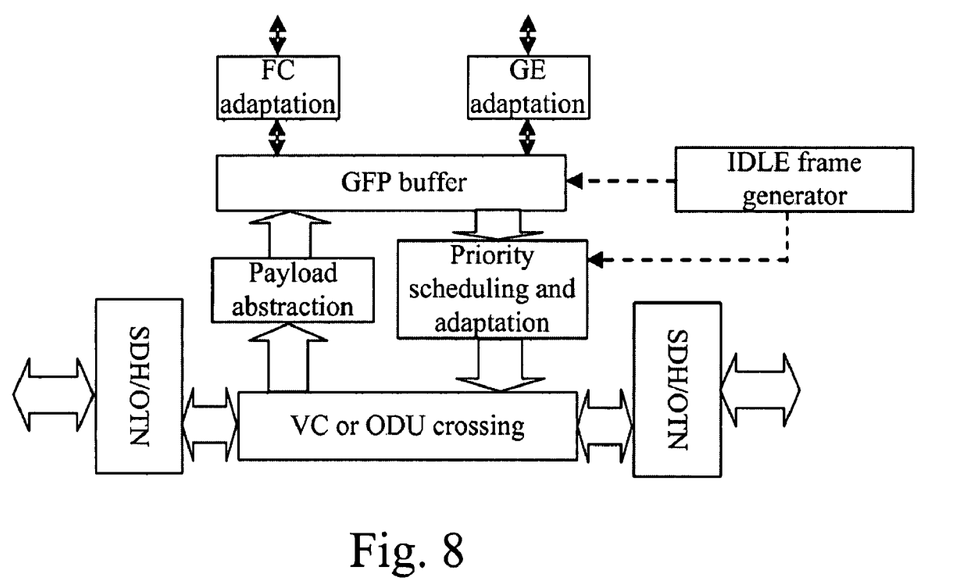
FIG. 8 illustrates an architecture diagram of a statistical add/drop multiplexing system according to an embodiment of the present invention.

With the above apparatus, a statistical add/drop multiplexing system for multiple data services in various types can be realized, as shown in FIG. 8. FIG. 8 shows a GFP-based statistical add/drop multiplexing system for multiple data services in various types. The system includes: at least one line synchronous receiving interface unit, adapted to terminate SDH/SONET/OTN signals and demultiplex the signals if necessary; a synchronous or asynchronous crossing unit, adapted to perform crossing on virtual containers or optical data units; at least one payload abstraction unit, adapted to abstract effective data in GFP data packets from synchronous signals sent by one or more virtual containers or optical data units; a GFP data packet buffer, containing multiple buffer queues corresponding to different priorities; at least one adaptation unit for data services in various types, adapted to perform adaptation for the data services in various types on client side, abstract effective data of the data services, assign appropriate priorities to the data, and then accomplish encapsulation of GFP-based data packets; a priority scheduling and adaptation unit, adapted to manage the buffer queues and map the data in the GFP data packets from the buffer to the one or more virtual containers or optical data units; an idle frame generator, adapted to generate idle frames in the GFP data packets, which can be put into a buffer queue with the lowest priority or directly transmitted to the priority scheduling unit to accomplish data rate adaptation between the GFP layer and the synchronous layer; one or more line synchronous sending interface units, adapted to accomplish multiplexing and framing of the virtual containers and optical data units and send the frames.

In the system shown in FIG. 8, parts of or all time slots (including virtual containers and ODUs) in a waveband or a line are used as a lower bearer layer for multiple data services in various types. GFP can allocate bandwidth on the bearer layer according to the statistics of characteristics of the multiple data services in various types. When the data services on upper layer have not use the bandwidth sufficiently, GFP can create IDLE frames automatically to adapt the bandwidth on the lower bearer layer.

The above embodiments are only used to describe but not to limit the present invention.

What is claimed is:

1. A Generic Framing Procedure (GFP)-based add/drop multiplexing apparatus, comprising:
   a line synchronous receiving unit, adapted to combine a variety of upstream byte synchronous interfaces into a unified byte synchronous interface;
   a buffer, adapted to store GFP data packets with different priorities;
   a line payload abstraction unit, adapted to abstract effective GFP data packets from synchronous receiving signals output by the line synchronous receiving unit and divert the effective GFP data packets according to GFP Channel IDs (CIDs) and priority identifications in the GFP data packets, transfer signals to be terminated locally to a local decapsulation and data adaptation unit, and put other signals into different buffer queues according to the priority identifications;

at least one local decapsulation and data adaptation unit, adapted to terminate data in the GFP data packets to be terminated locally from the line payload abstraction unit, recover GE signals, and transfer the signals downward to a service device;

at least one local add data signal adaptation and encapsulation unit, adapted to abstract payloads in local add data signals, assign appropriate priorities to the payloads, encapsulate the payloads into appropriate GFP data packets and put the GFP data packets into corresponding buffer queues;

a scheduling unit, adapted to perform scheduling on contents in the buffer according to a scheduling strategy;

a GFP idle frame generator, adapted to generate GFP idle frames;

an adaptation unit, adapted to multiplex and map signals from the scheduling unit and the GFP idle frames from the GFP idle frame generator to an appropriate byte synchronous interface;

a sending unit, adapted to send synchronous signals generated by the adaptation unit to a downstream node, and multiplex, in GFP, multiple GE connections among multiple nodes to a unified byte synchronous interface for transmission, wherein a bandwidth of the byte synchronous interface is smaller than a sum of peak bandwidths of the group of the multiple GE connections borne on the byte synchronous interface.

2. The GFP-based add/drop multiplexing apparatus according to claim 1, wherein the GFP idle frames from the GFP idle frame generator together with the signals from the scheduling unit are multiplexed and mapped to appropriate byte synchronous interfaces by the adaptation unit; or the GFP idle frames from the GFP idle frame generator are put into the buffer queues by the GFP idle frame generator and then directly output by the adaptation unit.

3. The GFP-based add/drop multiplexing apparatus according to claim 1, wherein the local decapsulation and data adaptation unit is also adapted to terminate client data management frames.

4. The GFP-based add/drop multiplexing apparatus according to claim 1, wherein the local add data adaptation and encapsulation unit is capable of creating a client data management frame, assigning an appropriate priority to the frame, and putting the frame into a corresponding buffer queue.

5. The GFP-based add/drop multiplexing apparatus according to claim 1, wherein the adaptation unit maps in form of concatenation or virtual concatenation the multiplexed GFP data packets to one or more byte synchronous interfaces.

6. The GFP-based add/drop multiplexing apparatus according to claim 1, wherein the local decapsulation and data adaptation unit and the local add data adaptation and encapsulation unit provide adaptation for data in Ethernet, Gigabyte Ethernet, Fast Ethernet, Fiber Channel, Enterprise Connection and Fiber Connection.

7. A Generic Framing Procedure (GFP)-based add/drop multiplexing system, comprising:

at least one line synchronous receiving interface unit, adapted to terminate Synchronous Digital Hierarchy (SDH)/Synchronous Optical Network (SONET)/Optical Transport Network (OTN) signals and demultiplex the signals;

a synchronous or asynchronous crossing unit, adapted to perform crossing on virtual containers or optical data units;

at least one payload abstraction unit, adapted to abstract effective data in GFP data packets from synchronous signals sent by one or more virtual containers or optical data units;

a GFP data packet buffer, containing multiple buffer queues corresponding to different priorities;

at least one data service adaptation unit, adapted to perform client-side data service adaptation, abstract effective data service data, assign appropriate priorities to the effective data, and accomplish encapsulation of GFP data packets;

a propriety scheduling and adaptation unit, adapted to manage the buffer queues and map data in the GFP data packets from the buffer to one or more virtual containers or optical data units;

an idle frame generator, adapted to generate idle frames in GFP data packets, wherein the idle frames are put into a buffer queue with a lowest priority or directly transmitted to the priority scheduling unit for accomplishing rate adaptation between a GFP layer and a synchronous layer;

at least one line synchronous sending interface unit, adapted to accomplish multiplexing and framing of the virtual containers and optical data units and then send resulting frames.

8. The GFP-based add/drop multiplexing system according to claim 7, wherein the data service adaptation unit is adapted to terminate client data management frames.

9. The GFP-based add/drop multiplexing system according to claim 7, wherein the data service adaptation unit is adapted to create client data management frames, assign appropriate priorities to the frames, and put the frames into corresponding buffer queues.

10. The GFP-based add/drop multiplexing system according to claim 7, wherein the data service adaptation comprises adaptation of data in Ethernet, Gigabyte Ethernet, Fast Ethernet, Fiber Channel, Enterprise Connection and Fiber Connection.

* * * * *